March 23, 1937.   H. E. KAISER   2,074,963
METHOD FOR THE CONTINUOUS PRODUCTION OF ABIETIC ACID ESTERS
Filed Oct. 31, 1935
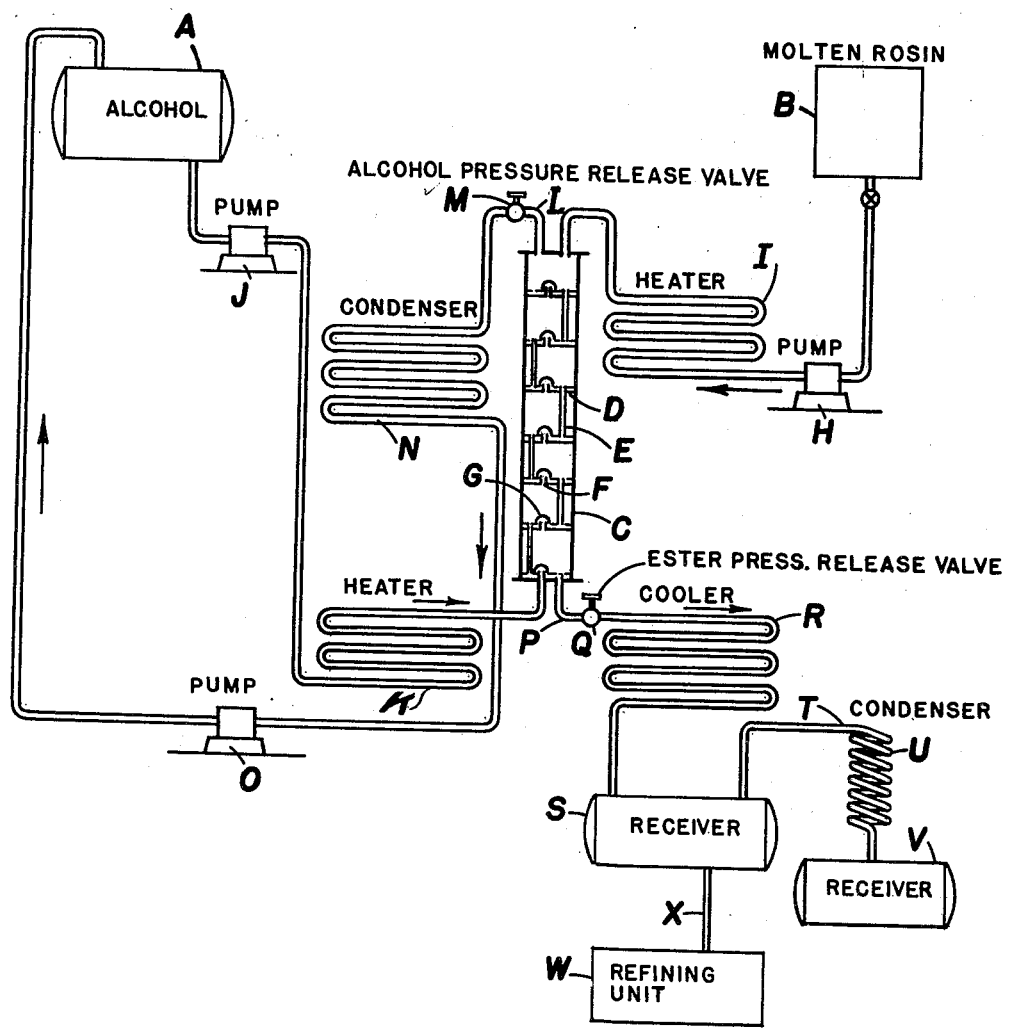
WITNESS:
Geo. F. Bennett
INVENTOR
HARRY E. KAISER
BY
Burson & Harding
ATTORNEYS.

Patented Mar. 23, 1937

2,074,963

UNITED STATES PATENT OFFICE 2,074,963

METHOD FOR THE CONTINUOUS PRODUCTION OF ABIETIC ACID ESTERS

Harry E. Kaiser, Temple City, Calif., assignor to Hercules Powder Company, Wilmington, Del., a corporation of Delaware Application October 31, 1935, Serial No. 47,600

23 Claims. (Cl. 260—99.40)

This invention relates to a method for the continuous production of esters of resin acids, rosin, or stabilized rosin. More particularly, the invention relates to a method for the continuous production to esters of those acids occuring in rosin, as, for example, abietic acid, pimaric acid, etc., and of their stabilized counterparts, for example, hydrogenated, polymerized, or intra-molecularly rearranged rosin acids, by esterification with an alcohol, as a lower aliphatic alcohol, as, for example, a monohydric aliphatic alcohol.

Heretofore, the direct production of esters of abietic acid or rosin with a lower aliphatic monohydric alcohol has been effected by esterification of abietic acid or rosin with an alcohol in the presence of heat and usually also of an esterification catalyst. The methods heretofore known have involved reaction of either abietic acid or rosin with alcohol in a batch process.

The methods heretofore known for the direct production of esters of abietic acid or rosin with the use of various lower aliphatic monohydric alcohols, as methyl, ethyl, propyl, isopropyl, butyl, amyl, etc., have been open to various disadvantages, particularly in the requirement for relatively high temperature in the case of monohydric alcohols, also of relatively high pressure and, in the requirement of a relatively long time for the obtaining of efficient yields. Further disadvantage has heretofore been found in corrosion of apparatus from the use of an acid catalyst and in decomposition of rosin.

Now in accordance with this invention there is provided a method for the production of esters of those acids occurring in rosin, as, for example, abietic acid, pimaric acid, etc., and of their stabilized counterparts, for example, hydrogenated, polymerized, or intra-molecularly rearranged rosin acids, by reaction with various alcohols and, more particularly, lower aliphatic alcohols, whereby an efficient yield may be obtained in a minimum of time; whereby the reaction may be carried out at relatively lower temperature and at relatively lower pressure than heretofore, whereby decomposition of rosin or abietic acid will be largely avoided, whereby smaller excess of alcohol than heretofore will be required and whereby decomposition or hydrolysis of the ester product will be largely, if not wholly, avoided. Further, in accordance with the method embodying this invention corrosion of apparatus and decomposition of rosin are avoided.

In accordance with this invention, a rosin acid, as, for example, abietic acid, pimaric acid, etc., or wood or gum rosin itself, either crude or refined, or a stabilized rosin acid or rosin, and alcohol are contacted for reaction in countercurrent. More particularly, molten rosin and alcohol are introduced continuously at opposite ends of a reaction chamber and counterflowed therethrough. Excess alcohol is recovered as is the ester product, all in a closed system which may be maintained under desired pressure, depending upon the alcohol used.

The stabilized rosin or rosin acid which may be esterified in accordance with this invention is a rosin, for example, a wood or gum rosin, or a rosin acid, as abietic or pimaric acid, which has been treated to reduce its apparent unsaturation and its tendency to oxidation on exposure to air. Such stabilized rosin may be prepared from refined or unrefined wood or gum rosin, and may or may not be refined after the stabilization treatment as may be desired. The stabilized rosin used in accordance with this invention may, for example, be a hydrogenated rosin produced by the catalytic addition of hydrogen to rosin; it may be a polymerized rosin produced by the polymerization of a rosin by treatment with a polymerizing agent, such as boron trifluoride, or other metallic halides, sulfuric acid, etc., according to methods well-known to the art; or it may be a rosin stabilized by intramolecular rearrangement of a rosin with a reduction in the apparent unsaturation, accomplished, for example, by treatment with a suitable catalyst, as for example, hydrogenation catalyst, as nickel, palladium, etc., at an elevated temperature of, for example, from about 150° C. to about 200° C. under conditions that will insure against a reaction between the rosin and any other substance, e. g., hydrogen, as is more fully disclosed in the copending application of Edwin R. Littmann, Serial No. 6,403, filed February 13, 1935. Stabilized rosin acids may be produced by similar treatment of the various rosin acids.

In the practical adaptation of this invention rosin or a rosin acid, stabilized or not, may be reacted with, for example, monohydric aliphatic alcohols, as methyl, ethyl, propyl, butyl, amyl, etc. and their isomers, or mono-ethers of glycols, as a mono-methyl, ethyl, butyl, etc., ether of ethylene, propylene, etc. glycol.

The alcohol and rosin or rosin acid, stabilized if desired, may be reacted in various proportions, depending upon the alcohol used. However, generally speaking, a molar ratio between monohydric aliphatic alcohols and rosin acid may be about 2—25 to 1, depending upon the reactivity of the alcohol, time of reaction, temperature, pressure, etc.

In the practical adaptation of this invention the conditions under which the reaction is brought about and carried on in the reaction chamber, more especially the temperature and pressure conditions, will vary with various alcohols. Generally speaking, where a monohydric aliphatic alcohol is used, the reaction may be carried out at a temperature within, for example, about the range 230° C.–360° C. and at a pressure within the range about 500–3500 pounds per square inch. The time required for the reaction between the rosin and alcohol will be various depending upon the temperature, pressure, etc., but is generally stated as within the range 10 minutes to 2 hours.

Having indicated in a general way the nature and purpose of this invention, the practical carrying out of the method will be exemplified in connection with description of the apparatus embodying the invention, and which is illustrated in the accompanying drawing in which the single figure is a diagrammatic illustration of the preferred form of apparatus.

Referring to the drawing A indicates a container for alcohol and B indicates a container for molten rosin. C indicates a reaction chamber which comprises, for example, a cylindrical tower divided into sections horizontally by means of plates D, the sections being connected by means of downtake pipes E and by means of uptake pipes F provided with bubble caps G. A plurality of towers in series may be provided if desired.

A pump H is provided and arranged to draw molten rosin from container B and force it through a heater I into the reaction chamber C at the top thereof. A pump J is provided and arranged to draw alcohol from the container A and force it through a heater K into the bottom of the reaction chamber C. A pipe L containing a pressure release valve M leads from the top of the tower to a condenser N for the cooling and condensation of gases passing from the top of the tower. A pump O is associated to withdraw condensed alcohol from cooler and condenser N and discharge it into tank A. A pipe P containing a pressure release valve Q leads from the bottom of the reaction chamber C to a cooler R. Ester product passes from the reaction chamber through pipe P into the cooler and from thence to a receiver S. From the receiver S a pipe T leads to a condenser U which in turn is connected to a receiver V. Any esterification product which passes from the receiver into the pipe T in which it is condensed is passed from thence to receiver V.

The crude ester product may be withdrawn from the receiver S for such purpose as may be desired, as for the use or future refining. If desired, the receiver S may be connected with a refining unit W by means of pipe X. The refining unit W may comprise a suitable still in which the crude ester product is refined by distilling under vacuum in the presence of sufficient alkali, as for example, sodium carbonate, to neutralize any excess abietic acid with which the ester product may be admixed. The alcohol will be preferably but not necessarily anhydrous.

In carrying out the method in accordance with this invention with the use of the apparatus described, the tank A is charged with alcohol and the container B is charged with molten rosin. The heaters I and K are heated by any suitable means, as for example, by heated fluid contained in jackets about the heaters or in any other suitable manner and the coolers are suitably cooled, as for example, by passage of cooling fluid through jackets around the heaters. Condensers are likewise suitably cooled. The pumps J and H are started and operate respectively to force alcohol through the heater K and rosin through the heater I, countercurrently into the reaction chamber C. The rosin passes through the tower from section to section while the alcohol passes upwardly in vapor phase from section to section and is caused to bubble through the heated rosin in the several sections successively by the bubble caps G. The temperature of the rosin and alcohol may be and is desirably maintained in the reaction chamber by any suitable heating thereof, as for example, by passing a heated fluid through jacket about the reaction chamber.

The heated molten rosin and alcohol vapor are thoroughly and efficiently contacted in the reaction chamber, it being noted that the strongest alcohol vapor entering the bottom of the tower contacts with the weakest rosin; i. e., rosin containing a large amount of ester while the strongest rosin entering the top of the tower contacts with the weakest alcohol; i. e., alcohol weakened by water evolved in the reaction. By virtue of contacting the strongest alcohol with the weakest rosin, decomposition and hydrolysis of the ester product is largely avoided.

Excess alcohol passes from the reaction chamber C through the pipe L into the condenser N wherein it is condensed and from which it is returned to the alcohol tank A by pump O. Ester product leaves the bottom of the reaction chamber C through pipe P and passes through cooler R into the ester product receiver S from which any excess alcohol passes through pipe T into condenser U and is collected in receiver V. The ester product collected in receiver S may be passed through a pipe X into a refining unit W which, as explained, may provide a still in which the ester product may pass for the neutralization of free abietic acid by distillation over soda ash or other fixed alkali.

It will now be observed by virtue of the counterflow of rosin and alcohol in the reaction chamber C, highly efficient and thorough contact between the alcohol and the rosin is obtained. At the same time, by virtue of the contacting of the strongest alcohol with the weakest rosin, decomposition or hydrolysis of the ester product is largely avoided. Decomposition of rosin is largely avoided, since by virtue of the counterflow and consequent efficient contact between the alcohol and rosin the reaction between the rosin and alcohol is effected in a minimum of time and hence the rosin is subjected to the relatively high temperature of reaction of a minimum time. Due to the counterflow and consequent efficiency of contact a minimum excess of alcohol is required.

It will be understood that in the foregong description of the method and apparatus in accordance with this invention, when the term rosin is used, that refined or unrefined wood or gum rosin, a rosin acid, or stabilized wood or gum rosin or rosin acid may be used equivalently for one another.

As illustrative of the carrying out of the method embodying this invention for use of the apparatus illustrated and described, for example, for the production of ethyl abietate, the reaction between the rosin and ethyl alcohol may be effected at a temperature of about 275° C. and under a pressure maintained in the reaction chamber of about 900 pounds. The proportion of ethyl alcohol to rosin may, for example, be in the molar ratio 5—20 to 1. Where the production of methyl abietate is desired, the reaction may be carried out, for example, at a temperature of about 260° C. under 1700 pounds pressure. The proportion of methyl alcohol and rosin may be in the molar ratio of 2—20 to 1.

It will be understood that where the reaction is carried out under pressure, the pressure on the excess alcohol passing from the top of the reaction chamber through pipe L will be released by pressure release valve M, while pressure on the ester product passing from the bottom of the reaction chamber through pipe P will be released through pressure pipe Q. As will be obvious, where the reaction is carried on at atmospheric pressure, the pressure release valves will not function.

It will be understood that the apparatus embodying this invention as illustrated and described and the modus operandi of the method embodying this invention as described may be widely varied without departing from the invention. That is to say, the details of the apparatus may be widely varied and the factors of pressure, time, temperature, etc., may be widely varied, without departing from the invention which in essence contemplates the effecting of esterification of abietic acid, rosin or stabilized rosin with the reagents in counterflow.

It will be understood that in the appended claims when the term stabilized rosin or rosin acid is used, such is intended to mean a rosin or rosin acid which has been treated to reduce its apparent unsaturation and hence to reduce its tendency to atmospheric oxidation, and includes, for example, hydrogenated rosin, polymerized rosin or rosin which has been stabilized by intramolecular rearrangement in the presence of a suitable catalyst or rosin acids similarly treated.

This application is a continuation in part of my application for United States patent, Serial No. 573,383, filed November 6, 1931.

What I claim and desire to protect by Letters Patent is:

1. The method for the continuous production of a rosin acid ester which includes contacting a material selected from the group consisting of rosin, stabilized rosin, rosin acids and stabilized rosin acids with a lower aliphatic alcohol in counterflow in the presence of heat at a temperature to cause esterification.

2. The method for the continuous production of a rosin acid ester which includes contacting a rosin acid with a lower aliphatic alcohol in counterflow in the presence of heat at a temperature to cause esterification.

3. The method for the continuous production of a rosin acid ester which includes contacting stabilized rosin with a lower aliphatic alcohol in counterflow in the presence of heat at a temperature to cause esterification.

4. The method for the continuous production of a rosin acid ester which includes contacting a stabilized rosin acid with a lower aliphatic alcohol in counterflow in the presence of heat at a temperature to cause esterification.

5. The method for the continuous production of a rosin acid ester which includes contacting hydrogenated rosin with a lower aliphatic alcohol in counterflow in the presence of heat at a temperature to cause esterification.

6. The method for the continuous production of a rosin acid ester which includes contacting polymerized rosin with a lower aliphatic alcohol in counterflow in the presence of heat at a temperature to cause esterification.

7. The method for the continuous production of an abietic acid ester which includes contacting abietic acid and a lower aliphatic alcohol in counterflow in the presence of heat at a temperature to cause esterification.

8. The method for the continuous production of an abietic acid ester which includes contacting molten rosin and lower aliphatic alcohol in vapor phase in counterflow in the presence of heat at a temperature to cause esterfication.

9. The method for the continuous production of an abietic acid ester which includes contacting abietic acid and a lower aliphatic alcohol in counterflow in the molar ratio of 1 to 2—25 in the presence of heat at a temperature to cause esterification.

10. The method for the continuous production of an abietic acid ester which includes contacting abietic acid with a lower aliphatic alcohol in counterflow, under pressure and in the presence of heat, at a temperature to cause esterification.

11. The method for the continuous production of an abietic acid ester which includes contacting abietic acid with a monohydric alcohol in counterflow, under pressure and in the presence of heat, at a temperature to cause esterification.

12. The method for the continuous production of an abietic acid ester which includes contacting molten rosin and a lower aliphatic alcohol in counterflow in the molar ratio of 1 to 2—25 in the presence of heat at a temperature to cause esterification.

13. The method for the continuous production of an abietic acid ester which includes contacting rosin and a monohydric alcohol in counterflow at a temperature within about the range of 230° C.–390° C. and under a pressure within about the range of 500–3500 pounds per square inch.

14. The method for the continuous production of an abietic acid ester which includes contacting rosin and a monohydric alcohol in counterflow at a temperature within about the range of 225° C.–325° C. and under a pressure up to about 600 pounds per square inch.

15. The method for the continuous production of an abietic acid ester which includes preheating rosin to a molten state, vaporizing a lower aliphatic alcohol, and counterflowing the rosin and alcohol vapor in the presence of heat at a temperature to cause esterification.

16. The method for the continuous production of an abietic acid ester which includes preheating rosin to a molten state, pereheating a lower aliphatic alcohol to a vapor state, and forcing the rosin and alcohol vapor in counterflow under pressure and in the presence of heat at a temperature to cause esterification.

17. The method for the continuous production of an abietic acid ester which includes preheating rosin to a molten state, vaporizing a monohydric alcohol, and forcing the rosin and alcohol vapor in counterflow under pressure in the presence of heat to cause esterification.

18. The method for the continuous production of an abietic acid ester which includes preheating rosin to a molten state, vaporizing a lower aliphatic alcohol, forcing the rosin and alcohol vapor in counterflow under pressure and in the presence of heat at a temperature to cause esterification, withdrawing ester produced and excess alcohol from the path of counterflow and releasing pressure on excess alcohol and ester produced while maintaining pressure in the path of counterflow.

19. The method for the continuous production of a rosin acid ester which includes preheating stabilized rosin to a molten state, preheating a lower aliphatic alcohol to a vapor state, and forcing the stabilized rosin and alcohol vapor in counterflow under pressure and in the presence of heat at a temperature to cause esterification.

20. The method for the continuous production of a rosin acid ester which includes preheating hydrogenated rosin to a molten state, preheating a lower aliphatic alcohol to a vapor state, and forcing the hydrogenated rosin and alcohol vapor in counterflow under pressure and in the presence of heat at a temperature to cause esterification.

21. The method for the continuous production of a rosin acid ester which includes preheating polymerized rosin to a molten state, preheating a lower aliphatic alcohol to a vapor state, and forcing the polymerized rosin and alcohol vapor in counterflow under pressure and in the presence of heat at a temperature to cause esterification.

22. The method for the continuous production of a rosin acid ester which includes contacting intramolecularly rearranged rosin having an apparent unsaturation less than that of rosin with a lower aliphatic alcohol in counterflow in the presence of heat at a temperature to cause esterification.

23. The method for the continuous production of a rosin acid ester which includes preheating intramolecularly rearranged rosin having an apparent unsaturation less than that of rosin to a molten state, preheating a lower aliphatic alcohol to a vapor state, and forcing the intramolecularly rearranged rosin and alcohol vapor in counterflow under pressure and in the presence of heat at a temperature to cause esterification.

HARRY E. KAISER.